US010822174B2

(12) United States Patent
Hinterholzer

(10) Patent No.: US 10,822,174 B2
(45) Date of Patent: Nov. 3, 2020

(54) CONVEYING SYSTEM

(71) Applicant: LHB MINING SOLUTIONS GMBH, Leoben (AT)

(72) Inventor: Stefan Hinterholzer, Leoben (AT)

(73) Assignee: LHB MINING SOLUTIONS GMBH, Leoben (AT)

( * ) Notice: Subject to any disclaimer, the term of this patent is extended or adjusted under 35 U.S.C. 154(b) by 0 days.

(21) Appl. No.: 16/344,744

(22) PCT Filed: Oct. 17, 2017

(86) PCT No.: PCT/EP2017/076491
§ 371 (c)(1),
(2) Date: Apr. 24, 2019

(87) PCT Pub. No.: WO2018/077670
PCT Pub. Date: May 3, 2018

(65) Prior Publication Data
US 2019/0270594 A1 Sep. 5, 2019

(30) Foreign Application Priority Data
Oct. 24, 2016 (AT) ................ GM 262/2016

(51) Int. Cl.
*B65G 23/16* (2006.01)
*B65G 23/06* (2006.01)
(52) U.S. Cl.
CPC ............ *B65G 23/16* (2013.01); *B65G 23/06* (2013.01); *B65G 2207/36* (2013.01)
(58) Field of Classification Search
CPC .................. B65G 23/06; B65G 23/16
(Continued)

(56) References Cited

U.S. PATENT DOCUMENTS 3,033,353 A  5/1962 Burnett et al.
4,058,204 A  11/1977 Arieh
(Continued)

FOREIGN PATENT DOCUMENTS

CH    708 428 A1   2/2015
DE    10 71 584    6/1960
(Continued)

OTHER PUBLICATIONS

English Translation of Written Opinion of the International Searching Authority for International Application No. PCT/EP2017/076491, dated Jan. 11, 2018, 6 pages.
(Continued)

*Primary Examiner* — Douglas A Hess
(74) *Attorney, Agent, or Firm* — Lewis Roca Rothgerber Christie LLP

(57) ABSTRACT

Embodiments of the present invention relate to a conveying system for conveying an item to be conveyed. The conveying system comprises a conveying track which comprises a conveying surface on which the item to be conveyed is placeable, wherein the conveying track comprises a coupling surface formed adjacent to the conveying surface, wherein the coupling surface comprises a first coupling profile. The conveying system further comprises at least one conveying drive for driving and/or braking the conveying track, wherein the conveying drive comprises a second coupling profile. The first coupling profile is coupled with the second coupling profile in such a way that the conveying drive is coupled with the conveying track in an interlocking manner for transferring a conveying force.

19 Claims, 12 Drawing Sheets

(58) Field of Classification Search
USPC .................................... 198/833, 834, 835
See application file for complete search history.

(56) References Cited

U.S. PATENT DOCUMENTS

| | | | | |
|---|---|---|---|---|
| 4,082,173 | A | * | 4/1978 | Simon-Kochloffel ..................... B66B 23/02 198/330 |
| 4,175,796 | A | * | 11/1979 | Boggs ............... B62D 55/0885 305/115 |
| 4,332,317 | A | | 6/1982 | Bähre et al. |
| 5,174,437 | A | * | 12/1992 | Burger .................... B30B 5/067 198/833 |
| 5,261,527 | A | * | 11/1993 | Krismanth ............ B65G 15/60 198/833 |
| 5,630,500 | A | * | 5/1997 | Conrad .................. B65G 15/42 198/833 |
| 5,934,862 | A | * | 8/1999 | Brown ...................... B60P 1/38 198/833 |
| 6,099,427 | A | * | 8/2000 | Brown .................. B65G 23/06 198/498 |
| 6,279,726 | B1 | * | 8/2001 | Etherington .......... B65G 45/10 198/494 |
| 6,766,898 | B2 | * | 7/2004 | Lessard ................... B65B 25/16 198/459.8 |
| 6,945,387 | B1 | | 9/2005 | Christensen |
| 7,210,573 | B2 | * | 5/2007 | Mol ...................... B65G 15/42 198/847 |
| 7,874,418 | B2 | * | 1/2011 | Steinstrater ........... B65G 23/16 198/833 |
| 7,926,641 | B2 | * | 4/2011 | Gonzalez Alemany ..................... B66B 23/028 198/330 |
| 8,464,862 | B2 | * | 6/2013 | Honeycutt ............. B65G 15/42 198/822 |
| 8,544,632 | B2 | * | 10/2013 | Gillet .................... B65G 17/44 198/465.2 |
| 9,169,072 | B2 | * | 10/2015 | Wehner .................... B60P 1/38 |
| 10,053,294 | B2 | * | 8/2018 | DeGroot ................ B65G 15/42 |
| 2009/0139830 | A1 | | 6/2009 | Gonzalez Alemany et al. |
| 2011/0226591 | A1 | | 9/2011 | Neubecker et al. |

FOREIGN PATENT DOCUMENTS

| | | |
|---|---|---|
| DE | 10 71 584 B | 6/1960 |
| DE | 21 24 022 A1 | 11/1971 |
| DE | 26 43 559 A1 | 3/1978 |
| DE | 28 31 004 A1 | 1/1980 |
| DE | 29 26 798 A1 | 1/1981 |
| DE | 91 03 775 U1 | 7/1991 |
| DE | 41 10 133 A1 | 10/1992 |
| DE | 202 08 385 U1 | 10/2002 |
| DE | 10 2006 008 657 A1 | 8/2007 |
| GB | 1 500 909 | 2/1978 |
| GB | 2 007 178 A | 5/1979 |
| GB | 2 148 826 A | 6/1985 |
| NL | 7603924 | 10/1976 |
| WO | WO 2014/121231 A1 | 8/2014 |
| WO | WO 2015/109008 A1 | 7/2015 |

OTHER PUBLICATIONS

English Machine Translation of the first Austrian Office action issued in Austrian priority-establishing utility Model No. GM 262/2016, dated Jun. 12, 2017, 2 page.
English Machine Translation of the fourth Austrian Office action issued in Austrian priority-establishing utility Model No. GM 262/2016, dated Mar. 11, 2019, 1 page.
International Preliminary Report on Patentability for International Application No. PCT/EP2017/076491, dated May 9, 2019, 10pp.
International Search Report for International Application No. PCT/EP2017/076491, dated Jan. 11, 2018, 7pp.
Written Opinion for International Application No. PCT/EP2017/076491, dated Jan. 11, 2018, 8pp.
Foreign Lang. Office action dated Jun. 12, 2017 for GM 262/2016, 3pp.
Foreign Lang. Office action dated Mar. 11, 2019 for GM 262/2016, 3pp.

* cited by examiner

CONVEYING SYSTEM

This application claims the benefit of the filing date of International Patent Application No. PCT/EP2017/076491 filed on Oct. 17, 2017, which claims priority to Austrian Utility Model Application No. GM 262/2016 filed on Oct. 24, 2016, the disclosures of which are hereby incorporated by reference herein in their entirety.

TECHNICAL FIELD

Embodiments of the present invention relate to a conveying system and a method of conveying a to be conveyed item. Embodiments of the invention relate to a conveying system, in particular to a conveying system with traction force limitation for steeply ascending conveyors, wherein the traction force is specifically limited or specifically kept below a maximum traction force independently of the conveying height of the conveyor by specifically selecting the number of intermediate drives, the distance between the intermediate drives, and the drive forces or drive powers at the intermediate drives.

BACKGROUND

Conveying systems for steeply ascending conveyors are known, which have their drive arranged at the upper end of the conveyor path and thereby dissipate the total traction force, which is composed of the own weight force of a dragging or carrying element, the weight force of the load, the motion resistance force, and the preload force, across this drive. In these conveying systems, the traction force steadily increases in accordance with their conveying height or elevation and is therefore directly dependent on the conveying height. With regard to throughput and conveying height, these conveying systems are limited or restricted by their maximal traction force, as the used tension carriers, such as straps, wires, chains etc. have limitations on their permitted loads.

SUMMARY

There may be a need for a steep conveyor system, in particular for vertically conveying heavy goods.

This need may be met by a conveying system for conveying a to be conveyed item or good and by a method of conveying a to be conveyed item or good in accordance with the independent claims.

According to a first aspect of the present invention, a conveying system for conveying a to be conveyed item is provided. The conveying system comprises a conveying track which comprises a conveying surface on which the item to be conveyed is placeable, wherein the conveying track comprises a coupling surface formed adjacent to the conveying surface, wherein the coupling surface comprises a first coupling profile. The conveying system further comprises at least one conveying drive for driving and/or braking the conveying track, wherein the conveying drive comprises a second coupling profile. The first coupling profile is coupled with the second coupling profile in such a way that the conveying drive is coupled with the conveying track in an interlocking manner for transferring a conveying force (e.g. a driving force or a braking force).

According to a further aspect of the present invention, a method of conveying a to be conveyed item is provided. The method comprises placing an item to be conveyed on a conveying surface of a conveying track, wherein the conveying track comprises a coupling surface formed adjacent to the conveying surface, wherein the coupling surface comprises a first coupling profile. The method further comprises driving and/or braking the conveying track by means of a conveying drive, wherein the conveying drive comprises a second coupling profile. The first coupling profile is coupled with the second coupling profile in such a way that the conveying drive is coupled with the conveying track in an interlocking manner for transferring a conveying force.

The conveying system according to exemplary embodiments of the invention serves to convey a to be conveyed item or good which has a high weight and is in particular to be conveyed with a vertical directional component. The to be conveyed good can for example consist of rocks or boulders or other bulk materials with large dimensions and high weights.

The conveying system comprises a conveying track. The conveying track can for example consist of a conveyor band or a belt conveyor, a conveyor chain or a conveyor band consisting of a plurality of conveying members. A conveying profile, such as for example a profiled surface, a conveyor surface in the style of an elevator conveyor or other carrying elements for carrying the to be conveyed goods, can be arranged on the conveyor surface of the conveying track.

The conveying track is movable along a conveying direction. Hereinafter, transverse to or across the conveying direction and along the width of the conveying track is defined as the transverse direction of the conveying track.

The conveying track is in particular formed as a closed loop. The to be conveyed goods are conveyed along a conveying path between a starting point and an end point, wherein the conveying track is deflected by a deflecting roller at the starting point and at the end point. Alternatively, the conveying track can be coiled or rolled up and decoiled or unwound at one of its ends.

The conveying track further forms the first coupling profile which engages in an interlocking coupling by means of a second coupling profile of the conveying drive. The first coupling profile and the corresponding second coupling profile can for example comprise a corresponding toothed profile. The first coupling profile or the second coupling profile can further comprise other engaging structures, such as for example the rod element described below, which extends transverse to a conveying direction of the conveying track.

The first coupling profile is thereby formed along the entire length of the conveying track. The first coupling profile can for example be releasably or detachably fastened to the conveying track, for example by means of a screw connection. The coupling profile can further be glued or soldered to the conveying track. Furthermore, it is possible that the conveying track is formed together with the first coupling profile and that the conveying track and the first coupling profile thereby form an integral and monolithic unit. The conveying track can for example be manufactured from a robust and flexible plastic material and/or rubber material.

The conveying drive serves to generate a conveying force in order to thereby drive the conveying track. For the force coupling, the first coupling profile is coupled to the second coupling profile in an interlocking manner, in order to thereby cause a precise and robust force transmission to the conveying track. The conveying force can on the one hand be utilized as a driving force in order to drive the to be conveyed goods or the conveying track, in particular in case of a certain slope or inclination, where the to be conveyed goods are to be conveyed from a lower starting point to a higher ending point. Due to the interlockingly engaging coupling, the conveying force can also be utilized as a breaking force. The conveying drive is thus utilized as a brake which counteracts the movement of the conveying track. For example, it is necessary that the conveying track is braked when a to be conveyed good is transported from a higher starting point to a lower ending point, in order to keep the speed of the conveying track constant or to reduce it. A conveying drive can thereby be formed as an electromotor which can also be operated as a generator. The conveying drive can further comprise a magnet brake or an eddy current brake, for example. Due to the interlockingly engaging coupling of the conveying track with the conveying drive, a robust force transmission can thus be provided, such that the conveying system is utilizable for heavy to be conveyed goods.

According to a further exemplary embodiment, the coupling surface of the conveying track is formed opposite to the conveying surface.

According to a further exemplary embodiment, the coupling surface of the conveying track is formed at the side (in relation to the conveying direction) of the conveying surface.

According to a further exemplary embodiment, the coupling surface of the conveying track is formed at the conveying surface. For example, the conveying track initially comprises two coupling tracks in the transverse direction at its edges, at which the first coupling profile is formed. The conveying surface, on which the to be conveyed goods are conveyed, is formed between the two coupling tracks.

According to a further exemplary embodiment, the first (or second) coupling profile forms a toothed profile. Thereby, the second coupling profile can for example consist of a conveyor chain into which the toothed profile of the first coupling profile selectively engages.

According to a further exemplary embodiment, the conveying system further comprises at least one pressing roller and one supporting roller, which are arranged in such a way that the conveying track is present between the pressing roller and the support roller, in order to stabilize the conveying track.

The pressing roller can also be arranged in such a way that the conveying track runs between the pressing roller and the conveying drive in order to press the conveying track against the conveying drive.

According to a further exemplary embodiment, the first coupling profile and/or the second coupling profile are formed as a toothed belt profile. The conveying track and/or the driving track, which is described below, can for example be correspondingly formed as a belt or a belt conveyor.

According to a further exemplary embodiment, the conveying system further comprises a coupling band, wherein the first coupling profile is formed at the coupling band which is fixated at the coupling surface, in particular by means of gluing, vulcanization or a mechanical connection. A mechanical connection can for example be implemented by means of a (in particular detachable) rivet or screw connection. In case of a defect at the coupling track or at the conveying track, a defective portion of the coupling track or conveying track can in particular be detached and replaced with an intact portion of the coupling track or conveying track.

According to a further exemplary embodiment, the conveying drive comprises a driving track, wherein at least a portion of the driving track extends parallel to a coupling portion of the conveying track. The driving track forms the second coupling profile such that the driving track is engaged with the conveying track in an interlocking manner along the coupling portion of the conveying track. The coupling portion is three to four times as long in the conveying direction as the width of the conveying track in the transverse direction. The coupling portion can also be formed to be longer.

The driving track can for example also form a driving band, a driving belt or a driving chain. The second coupling portion is formed at the driving track.

When using the driving track according to exemplary embodiments of the invention, the conveying force is not transmitted punctually or in a point by point manner but instead along an elongated coupling portion. Thereby, the conveying force can be gently transmitted as no punctual force peaks occur, when the conveying force is transmitted. This leads to less strain on the conveying track and accordingly to a more robust conveying system.

According to a further exemplary embodiment, the driving track forms a closed loop which is guided around two circulating rollers which are spaced apart. The rotational axes of the circulating rollers are arranged on a common central axis. At least one of the circulating rollers can be formed as a drive drum or a drive roller. These apply the conveying force, for example as a driving force or a braking force, and transmit it to the driving track.

According to a further exemplary embodiment, the conveying track forms a closed loop which is guided around two further circulating rollers which are spaced apart, wherein the conveying track comprises a leader portion and a return portion which are guided spaced apart from each other between the further circulating rollers. The driving track is arranged and formed such that at least a portion of the driving track is coupled with the first coupling profile at the leader portion and a further portion of the driving track is coupled with the first coupling profile at the return portion of the conveying track.

In particular the conveying surface, on which the to be conveyed good is conveyed, is formed at the leader portion. If the conveying system is conveying along a certain inclination, in which the to be conveyed good is conveyed to a certain height or elevation, then the leader portion leads from a lower circulating roller to an upper circulating roller. The return portion leads from the upper circulating roller to the lower circulating roller. The conveying drive correspondingly transmits a certain driving force over the conveying track in order to convey the to be conveyed good to the certain height. The conveying track correspondingly comprises a certain weight force along the return portion. The weight force thereby produces a force which counteracts the driving force by which the leader portion is driven. In the exemplary embodiment, a return portion of the driving track is coupled with the return portion of the conveying track, such that the weight force of the conveying track is transmitted to the driving track. Since the driving track is diverted at a lower position and the return portion of the driving track merges into the leader portion of the driving track, the introduced weight force is also diverted, such that this acts in the direction of the driving force and amplifies it correspondingly. Thereby, the weight force of the return portion of the conveying track can be gathered and diverted by the driving track, such that this can effectively be added to the driving force and amplifies it. Thereby, driving energy is saved and the conveying system is created more efficiently.

According to a further exemplary embodiment, the driving track is guided over at least one guiding roller. The guiding roller is arranged such that a distance between the central axis and the point of contact between the guiding roller and the driving track is larger than a diameter of at least one of the deflection rollers. Thus, the guiding roller presses the driving track away from the central axis. In other words, the feeding portion is pressed further away from the return portion of the driving track by means of the guiding roller, such that an exaltation is formed. Along this exaltation a more stable coupling with the first coupling profile of the conveying track is ensured.

According to a further exemplary embodiment, the driving track comprises at least one rod element which extends transverse to a conveying direction of the conveying track and forms the second coupling profile. The rod element for example comprises a round steel. The rod element can for example engage into a toothed profile as the first coupling profile of the conveying track in order to transmit the conveying force. The rod elements can in particular be replaceably arranged at the driving track such that a rapid replacement is made possible in case of a defect.

According to a further exemplary embodiment, the driving track comprises at least two separated (in the transverse direction) carrier tracks which in particular comprise chain elements, between which the at least one rod element is arranged.

According to a further exemplary embodiment, the conveying system further comprises coupling elements which form the second coupling profile. The coupling elements are fixated at the driving track. The coupling elements can for example comprise raised portions (bumps) which are formed to engage into the first coupling profile. The coupling elements can for example comprise an extension lateral to the conveying direction in order to engage into a corresponding toothed profile of the first coupling profile of the conveying track.

According to a further exemplary embodiment, the coupling elements are detachably coupled at the driving track, in particular by means of a screw connection.

According to a further exemplary embodiment, the conveying drive comprises a driving element, in particular a driving drum, which is coupled with the driving track in order to transfer a conveying force. The driving element can itself constitute a conveying track or it can constitute a round driving drum.

The driving element is for example driven by means of an electro motor or a combustion engine.

According to a further exemplary embodiment, the driving element is coupled with the driving track in a frictionally engaging manner. For example, the driving track and the driving element comprise an abrasive surface such that a frictional connection is enabled.

According to a further exemplary embodiment, the driving element comprises a further toothed profile and the driving track comprises a third coupling profile for coupling with the toothed profile of the driving element in an interlocking manner.

According to a further exemplary embodiment, the conveying system further comprises at least one further conveying drive for driving and/or breaking the conveying track. The further conveying drive is arranged in the conveying direction of the conveying track and spaced apart from the conveying drive, wherein the further conveying drive comprises a further second coupling profile. The first coupling profile of the conveying track is coupled with the further second coupling profile in such a way that the further conveying drive is coupled with the conveying track in an interlocking manner for transferring a conveying force.

The further conveying drive can comprise the same features as the conveying drive described above.

With the arrangement of a further conveying drive, the transmission of the needed conveying force is split and the divided conveying force is transferred to separated portions of the conveying track. Thereby, the total stress on the conveying track is reduced as the total conveying force is not transferred punctually at one particular location but instead a respectively reduced conveying force is transferred at more portions. The sum of all conveying forces that are transferred by means of the conveying drives forms the needed total conveying force.

According to a further exemplary embodiment, the traction force is specifically limited or specifically kept below a maximum traction force independently of the conveying height of the conveyor by specifically selecting the number of conveying drives (intermediate drives), the distance between the conveying drives, and the drive forces or drive powers at the conveying drives.

According to a further exemplary embodiment, the conveying track comprises an inclination (for example between 20 degrees and 90 degrees) relative to a horizontal, wherein the conveying drive and the further conveying drive are arranged at different heights or elevations relative to the horizontal.

According to a further exemplary embodiment, at least the conveying drive or the further conveying drive is modularly coupleable at the conveying track.

Thereby, an arbitrary number of conveying drives can be arranged along the conveying track. In particular, the conveying drives can be modularly coupled and decoupled depending on the needed conveying force. Since the first coupling profile is formed along the entire conveying track in a preferred embodiment, a corresponding conveying drive can be coupled on or decoupled at arbitrary locations.

According to a further aspect of the invention, a conveying system, in particular a conveying system with traction force limitation for steeply rising conveyors, is provided, characterized in that the traction force is specifically limited or specifically kept below a maximum traction force independently of the conveying height of the conveyor by specifically selecting the number of intermediate drives (i.e. the conveying drives described above), the distance between the intermediate drives, and the drive forces or drive powers at the intermediate drives.

According to another aspect, the force transmission by the intermediate drives to the conveyor takes place by means of frictional engagement.

According to another aspect, the force transmission by the intermediate drives to the conveyor takes place by means of interlocking engagement.

According to another aspect, the force transmission by the intermediate drives to the conveyor takes place partially by means of frictional engagement and partially by means of interlocking engagement.

According to another aspect, the force transmission by the intermediate drives to the conveyor takes place at the back side, at the front side or at the side of the dragging member.

According to another aspect, the layout of the line comprises different slopes along the conveying track.

According to another aspect, the increments or decrements of the conveying height at the conveyor with the same tension carrier are possible without limitation by means of the system with intermediate drives.

Embodiments of the invention aim at keeping the traction force of the mentioned conveyors limited or specifically below a maximum traction force independently of the conveying height. This is achieved by arranging multiple intermediate drives (conveying drives) along the conveying path. The conveying force transmission from the intermediate drive to the conveyor takes place either by frictional engagement or by interlocking engagement. The traction force is limited at the intermediate drives along the conveying path. Thereby, it is achieved that the traction force within a portion is limited or specifically kept below a maximum traction force. With the exemplary embodiments of this invention it is possible to utilize tension carriers (conveying tracks) such as belts, cables, chains, etc. with their limited permitted strain or load independently of the conveying height by selectively choosing the number of intermediate drives, the distance between the intermediate drives, and the drive forces or drive powers at the intermediate drives.

It is noted that the embodiments described herein merely constitute a limited selection of possible variations of embodiments of the invention. It is thus possible to combine the features of individual embodiments with each other in a suitable manner such that with the present explicit variations of embodiments a plurality of different embodiments are to be considered as apparently disclosed to the skilled person. In particular, some embodiments have been described with reference to method type claims whereas other embodiments have been described with reference to apparatus type claims. However, when reading this application a person skilled in the art will immediately realize that, unless otherwise explicitly indicated, in addition to any combination of features belonging to one type of subject matter, also any combination of features relating to different types of subject matter is possible.

BRIEF DESCRIPTION OF THE DRAWINGS

For further explanation and for better understanding of exemplary embodiments of the present invention, examples of embodiments will in the following be described in more detail with reference to the appended drawings. These show.

DETAILED DESCRIPTION OF EXEMPLARY EMBODIMENTS

Figure 1:
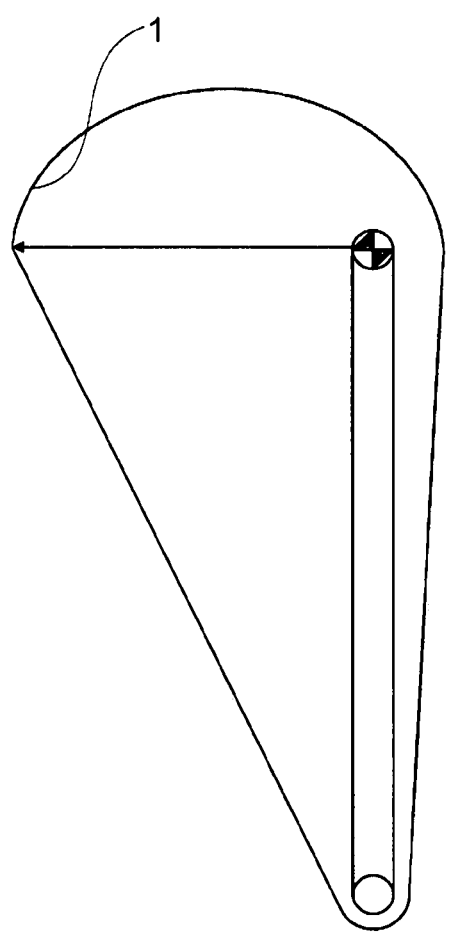
FIG. 1 shows a front view on a known steeply ascending conveyor with vertical course of the path and with drive at the upper end of the conveyor.

Identical or similar components in different figures are provided with the same reference numerals. The illustrations in the figures are schematic.

Exemplary embodiments of the invention are discussed in more detail on the basis of the drawings. FIG. 1 shows an outline of a conveyor with a vertical course of the path. The drive occurs at the upper end of the conveyor. The magnitude of the traction force is schematically illustrated with a traction force progression—which stands at 90° relative to the course of the path. The traction force 1 increases from the lower deflection to the upper deflection and is composed of the own weight force of the pull or carrier member, the load weight force, the motion resistive force and the preload force. The drive occurs at the upper end of the conveyor. The total traction force is dissipated at this drive.

Figure 2:
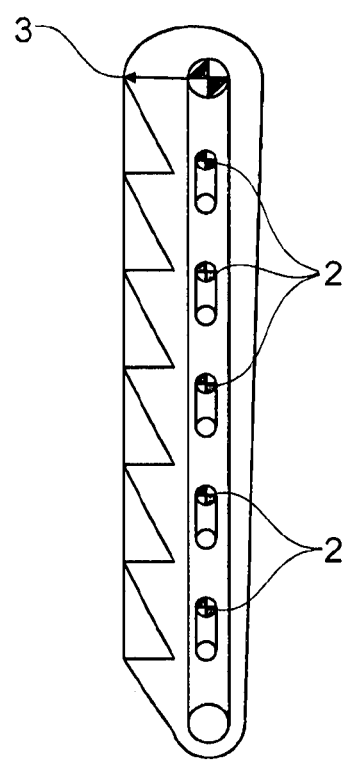
FIG. 2 shows a front view of the conveying system according to an exemplary embodiment of the present invention with limitation of traction force at steeply ascending conveyors through arrangement of intermediate drives.

FIG. 2 shows an outline of a conveyor with a vertical course of the path utilizing the conveying system with traction force limitation for steeply ascending conveyors. Starting from the lower deflection, the traction force increases with the same intensity as in FIG. 1. However, the drive takes place along the conveying path by one or more intermediate drives 2. The traction force is limited or reduced 3 at each intermediate drive along the conveying path. The conveying force transmission from the intermediate drive to the conveyor occurs either by frictional engagement or by interlocking engagement. With embodiments of this invention, the traction force is limited independently of the conveying height or elevation of the conveyor by specifically selecting the number of intermediate drives, the distance between the intermediate drives, and the drive forces or drive powers at the intermediate drives.

Figure 3A:
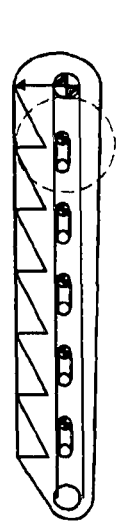
FIG. 3A and FIG. 3B show a detail of an intermediate drive with frictional engagement.
Figure 3B:
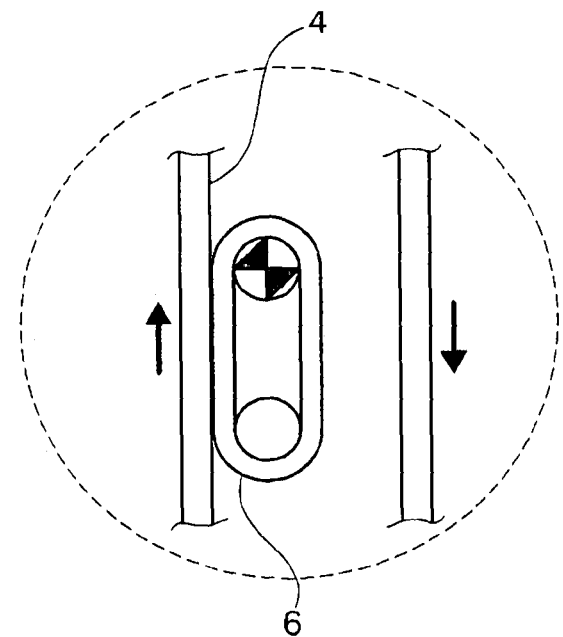
Figure 4A:
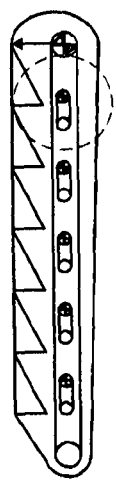
FIG. 4A and FIG. 4B show a detail of an intermediate drive with interlocking engagement.
Figure 4B:
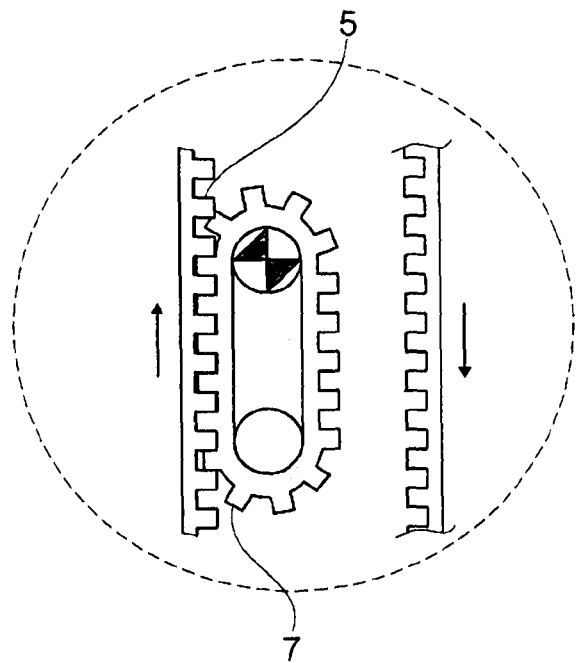

FIG. 3A and FIG. 3B show the arrangement of the intermediate drives as frictionally engaging force transmission and FIG. 4A and FIG. 4B show the arrangement of the intermediate drives as interlockingly engaged force transmission. A belt is depicted as traction and carrier member. This can be used with a smooth surface 4 for the frictional engagement or with a profiled surface 5 for the interlocking engagement. A belt is also depicted for the force transmission by the intermediate drive. This can be used with a smooth surface 6 for the frictional engagement or with a profiled surface 7 for the interlocking engagement. For guiding the conveyor along the path and in the region of the intermediate drives, carrier and/or supporting rollers can be utilized. It is noted that conveyors, such as e.g. a steep-incline conveyor belt, a belt bucket elevator, a chain bucket elevator, a chain conveyor, an apron conveyor, etc., can be utilized. Furthermore, another form of traction member can be chosen at the intermediate drive, such as e.g. a belt, a wire, a chain, etc. The arrangements, the number as well as the conveying force of the intermediate drives are decisive for the belt traction force limitation, not the type of traction member. It is furthermore possible to implement the traction member directly as a smooth drum for the frictionally engaging drive respectively as a profiled drum for the interlockingly engaging drive.

Figure 5:
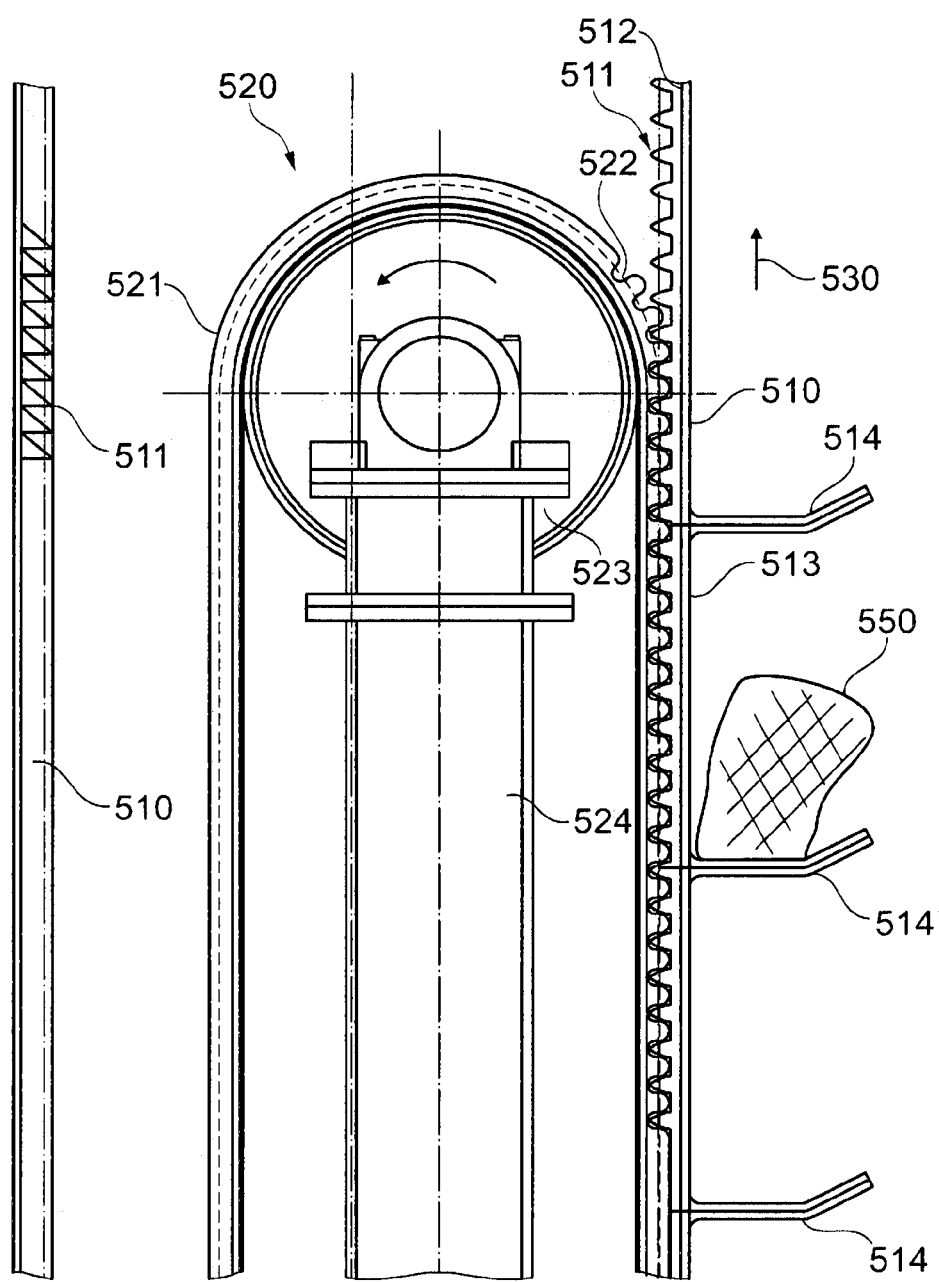
FIG. 5 shows a schematic illustration of a section of a conveying system with a conveying track and a driving track, according to an exemplary embodiment of the present invention.

FIG. 5 shows a schematic illustration of a section of a conveying system 500 for conveying an item 550 to be conveyed with a conveying track 510 and a driving track 521, according to an exemplary embodiment of the present invention.

The conveying system 500 comprises a conveying track 510 which comprises a conveying surface 513 on which the item 550 to be conveyed can be placed, wherein the conveying track 510 comprises a coupling surface 512 formed adjacent to the conveying surface 513, wherein the coupling surface 512 comprises a first coupling profile 511. The conveying system 500 further comprises at least one conveying drive 2, 520 for driving and/or braking the conveying track 510, wherein the conveying drive 520 comprises a second coupling profile 522. The first coupling profile 511 is coupled with the second coupling profile 522 in such a way that the conveying drive 520 is coupled with the conveying track 510 in an interlocking manner to transfer a conveying force.

The conveying system 500 comprises a conveying track 510. The conveying track 510 can for example be a conveying belt or a belt conveyor, a conveying chain or conveying track 510 consisting of multiple conveying members. A conveying profile, such as for example a profiled surface, a conveying surface in the style of a bucket conveyor or other carrier elements 514 for carrying the conveyed item 550, can be arranged on the conveying surface 513 of the conveying track 510.

The conveying track 510 is movable along a conveying direction 530. Lateral to the conveying direction and along the width of the conveying track 510 is in the following defined as the transverse direction of the conveying track 510.

The conveying track 510 is in particular formed as a closed loop. The conveyed item 550 is conveyed along the conveying path between a starting point and an end point, wherein the conveying track 510 is deflected at the starting point and at the end point by a deflection roller.

The conveying track 510 further forms the first coupling profile 511 which engages in an interlocking manner by means of a second coupling profile 522 of the conveying drive 520 or the conveying track 521. The first coupling profile 511 and the corresponding second coupling profile 522 can for example, as illustrated in FIG. 5, comprise a corresponding toothed profile.

The first coupling profile 511 is in that case for example formed along the complete length of the conveying track 510. The first coupling profile 511 can for example be detachably attached at the conveying track 510, for example by means of a screw connection. The coupling profile 511 can further by glued or welded onto the coupling surface 512 of the conveying track 510. It is further possible that the conveying track 510 is formed together with the first coupling profile 511 and that the conveying track 510 and the first coupling profile 511 thereby form an integral and monolithic unit.

The conveying drive 520 serves to generate a conveying force in order to thereby drive the conveying track 510. The first coupling profile 511 is coupled with the second coupling profile 522 in an interlocked manner for the force coupling to thereby cause a precise and robust force transmission to the conveying track 510.

Due to the interlocking coupling of the conveying track 510 with the conveying drive 520, a robust force transmission can thereby be provided so that the conveying system 500 is utilizable with heavy items 550 to be conveyed.

As illustrated in the exemplary embodiment of FIG. 5, the coupling surface 512 of the conveying track 510 is formed opposite to the conveying surface 513.

The conveying drive 520 in FIG. 5 comprises a driving track 521, wherein at least one section of the driving track 521 extends in parallel to a coupling portion or to the coupling surface 512 of the conveying track 510. The driving track 521 forms the second coupling profile 522 in such a way that the driving track 521 engages with the conveying track 510 in an interlocking manner along the coupling portion 512 of the conveying track 510. The coupling portion 512 is for example three to four times as long in the conveying direction 530 as the width of the conveying track 510 in the transverse direction.

By utilizing the driving track 521 according to exemplary embodiments of the invention, the conveying force is not transmitted punctually but along an elongated coupling portion 512. Thereby, the conveying force can be transferred gently since no punctual force peaks occur during transmission of the conveying force. This leads to less strain and load on the driving track 521 and accordingly to a more robust conveying system 500.

In the shown exemplary embodiment, the conveying drive 520 comprises a driving drum as a driving element 523 which is coupled with the driving track 521 for transmitting a conveying force. The driving element 523 can itself form a driving track (see FIG. 8) or it can form a round driving drum.

In FIG. 5, the driving element 523 is frictionally coupled with the driving track 521.

The conveying drive 520 shown in FIG. 5 can be utilized with the intermediate drives 2 in the figures FIG. 2 to FIG. 4B. The conveying system 500 correspondingly comprises multiple additional conveying drives 2, 520 for driving and/or braking the conveying track 510. The additional conveying drive 2, 520 is correspondingly arranged in the direction of movement 530 of the conveying track 510 with a distance to the conveying drive 2, 520, wherein the further conveying drive 2, 520 comprises a further second coupling profile 522. The first coupling profile 511 of the conveying track 510 is coupled with the further second coupling profile 522 in such a way that the further conveying drive 2, 520 is coupled with the conveying track 510 in an interlocking manner for transmitting a conveying force.

The conveying track 510 and correspondingly the driving track 521 can comprise an inclination relative to a horizontal, wherein the conveying drives 2, 520 can be arranged at different heights relative to the horizontal.

Figure 6:
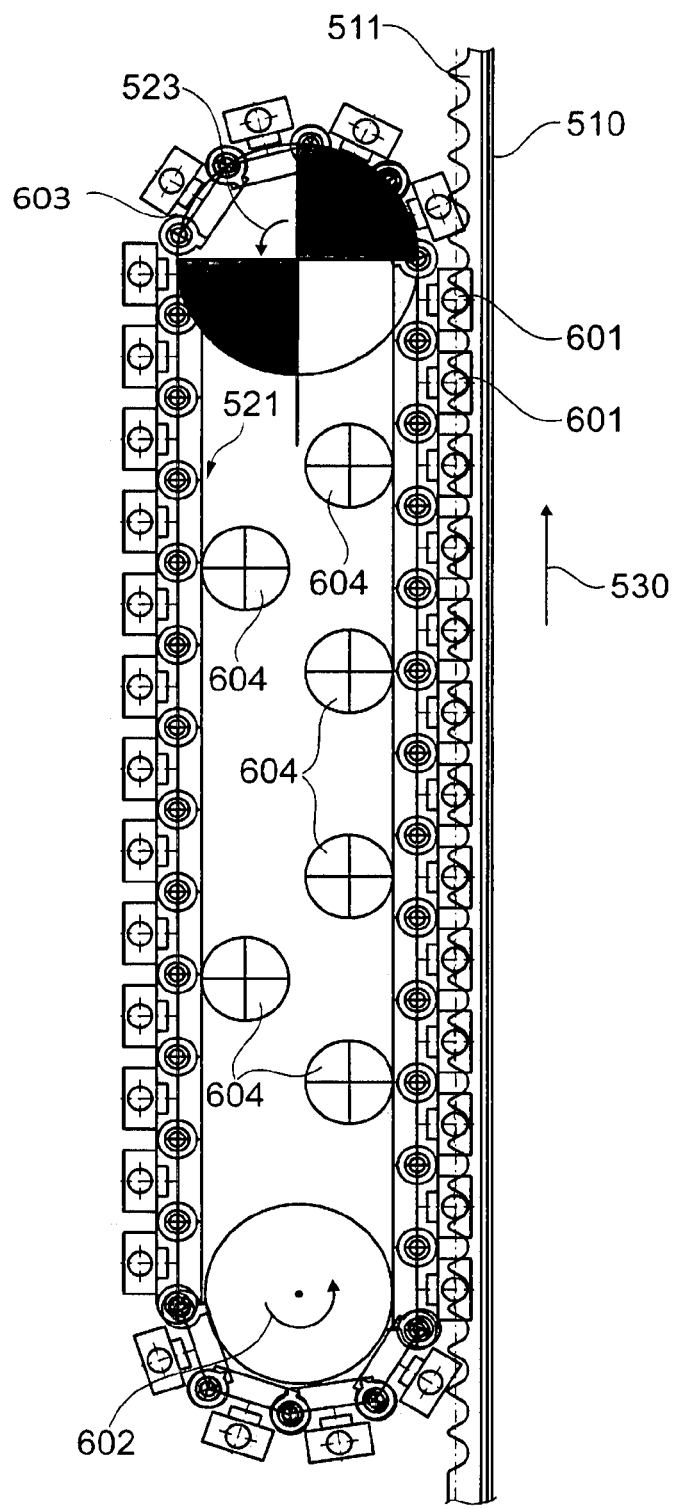
FIG. 6 shows a schematic illustration of a section of a conveying system with rod elements which form a second coupling profile, according to an exemplary embodiment of the present invention.

FIG. 6 shows a schematic illustration of a portion of a conveying system 500 with rod elements 601 which form the second coupling profile 522. The corresponding first coupling profile 511 of the conveying track 510 forms a toothed profile in which the rod elements 601 for example selectively engage. The rod elements 601 extend transverse to a conveying direction 530 of the conveying track 510. The rod elements 601 can in particular be replaceably arranged at the driving track 521 such that a fast replacement is possible in case of a defect.

Supporting rollers 604, which press the conveying track 521 against the conveying track 510 in order to assure an interlocking connection, are furthermore illustrated in FIG. 6. The driving track 521 is for example also deflected around deflecting roller in 602. The driving element 523 is for example implemented as a driving drum with an outer toothed profile for driving the driving track 521.

Figure 7:
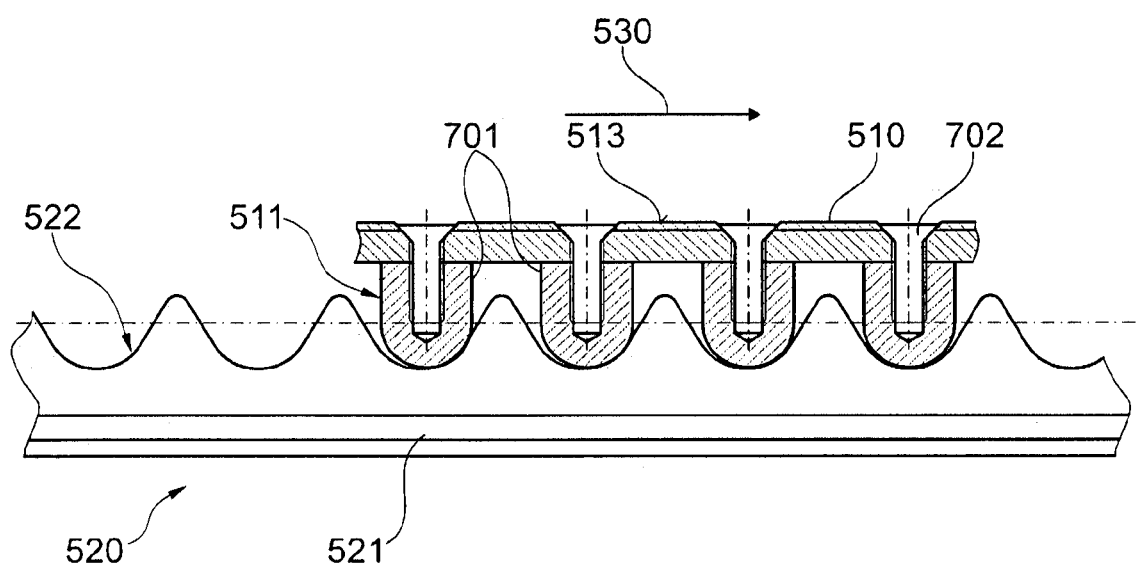
FIG. 7 shows a schematic illustration of a section of a conveying system with coupling bumps which are detachably coupled to the conveying track, according to an exemplary embodiment of the present invention.

FIG. 7 shows a schematic illustration of a portion of a conveying system 500 with coupling bumps 701 which are detachably coupled at the conveying track 510. The coupling bumps 701 form the first coupling profile 511. Die coupling bumps 701 are thereby detachably attached by means of a screw element 702. The coupling bumps 701 can thereby extend transverse to the conveying direction 530.

Figure 8:
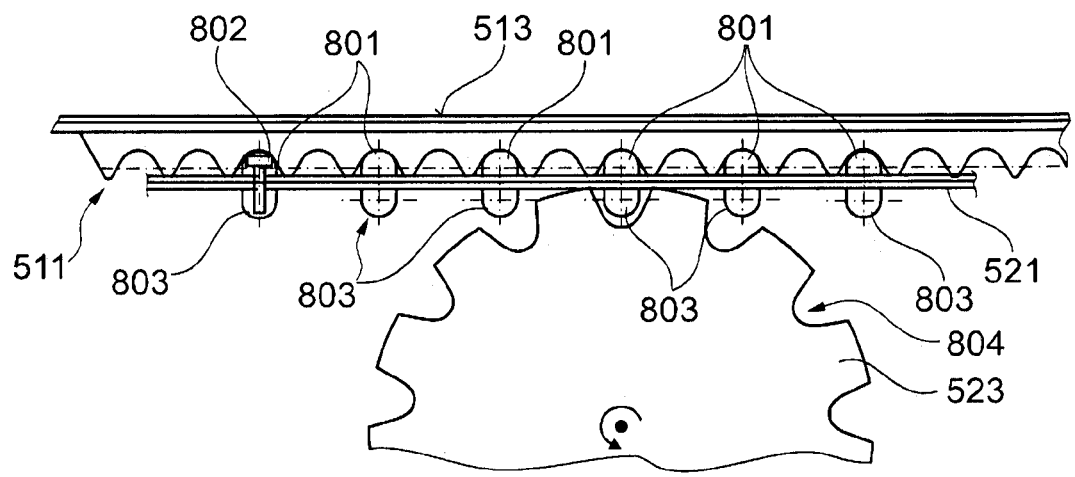
FIG. 8 shows a schematic illustration of a section of a conveying system with a conveying track comprising coupling elements, according to an exemplary embodiment of the present invention.

FIG. 8 is a schematic illustration of a portion of a conveying system 500 with a driving track 521 comprising coupling elements 801 which form the second coupling profile 522. The coupling elements 801 are fixated at the driving track 521. The coupling elements 801 can for example comprise raised portions (bumps) or rod elements, which are formed to engage into the first coupling profile 511. The coupling elements 801 can for example comprise an extension transverse to the conveying direction in order to engage into a corresponding toothed profile of the first coupling profile 511 of the conveying track 510.

The coupling elements 801 are detachably coupled to the driving track 521, in particular by means of a screw element 802.

The driving element 523 is formed as a driving wheel or a driving drum in the exemplary embodiment. The driving element 523 comprises a further toothed profile. The driving track 521 forms a third coupling profile 803 for coupling with the toothed profile 804 of the driving element 523 in an interlocking manner. The driving drum can be formed as a circulating drum such that the driving track 521 is guided around the driving drum. In the exemplary embodiment shown in FIG. 8, the driving track 521 runs straight or linearly (tangential) and is guided tangentially over the driving drum 521.

The third coupling profile 803 can for example be created with the coupling element 801. The coupling element 801 can thereby form raised portions along two opposing surfaces of the driving track 521 and correspondingly engage into the first coupling profile 511 and the further toothed profile 804 for transmitting a conveying force.

Figure 9:
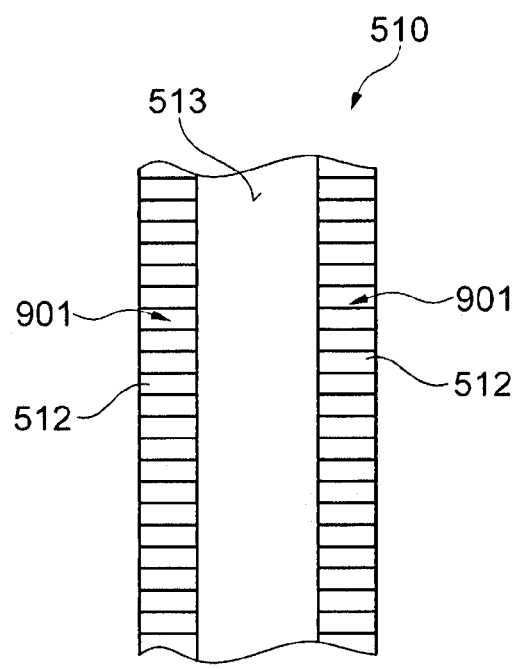
FIG. 9 shows a schematic illustration of a section of a conveying track comprising edge portions, according to an exemplary embodiment of the present invention.

FIG. 9 shows a schematic illustration of a section of a conveying track 510 comprising edge portions 901. The coupling surface 512 of the conveying track 510 at the conveying surface 513 can for example be formed at the edge portions 901. Initially, the conveying track 510 for example comprises two coupling tracks at its edges or edge portions 901, at which the first coupling profile 511 is formed. The conveying surface 513, on which the conveyed item 550 is conveyed, is formed between the two coupling tracks.

A surface without structure of the conveying track 510 can further be formed along the edge portions 901 so that corresponding pressing rollers 1401, 1402 (see FIG. 14) run along these edge portions 901 in order to press the conveying track 510 against a supporting roller 1403 (see FIG. 14) and/or the conveying drive 520.

Figure 10:
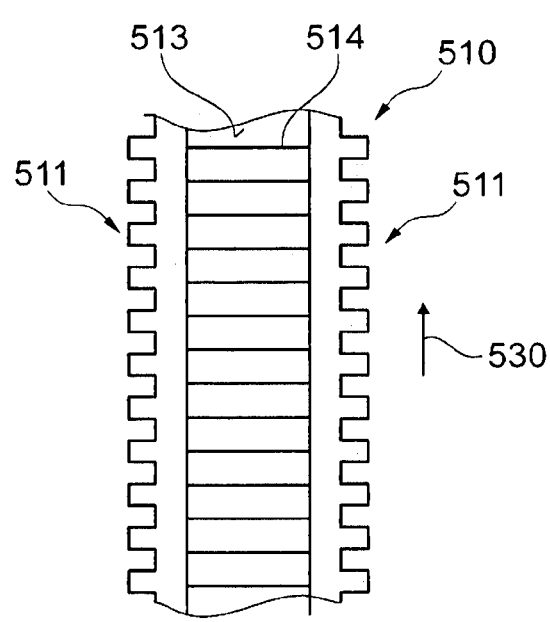
FIG. 10 to FIG. 12 show schematic illustrations of a conveying system with a conveying track comprising a lateral first coupling profile, according to an exemplary embodiment of the present invention.
Figure 11:
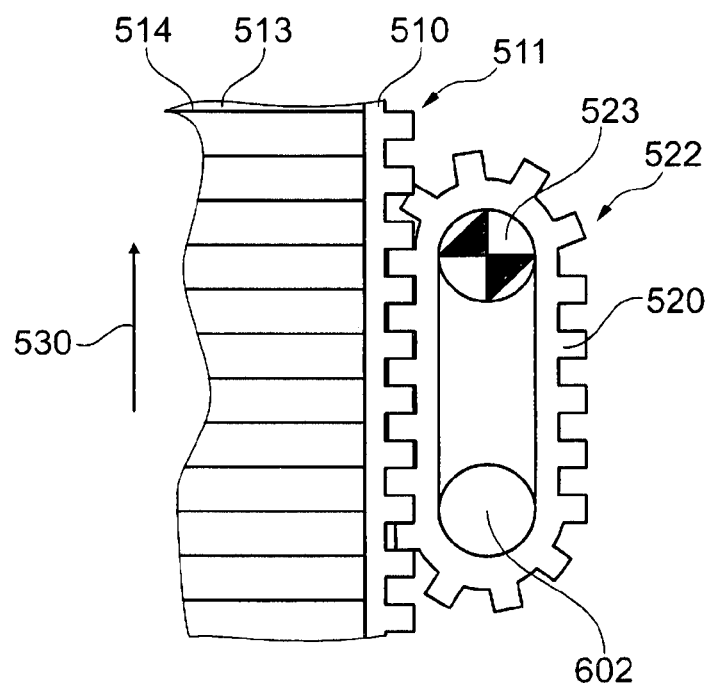
Figure 12:
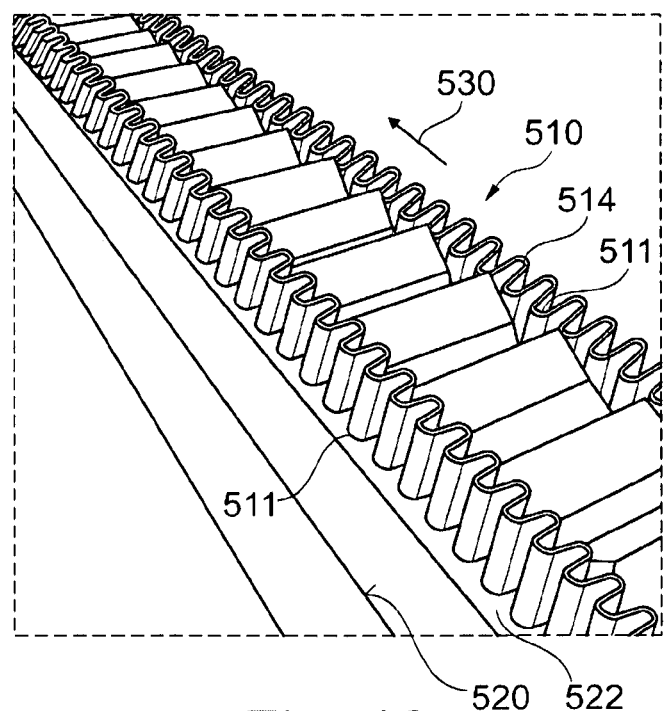

FIG. 10 to FIG. 12 show schematic illustrations of a conveying system 500 with a conveying track 510 which comprises lateral first coupling profiles 511. As illustrated in FIG. 11, the conveying force from the conveying drive 520 can be transmitted sideways to the conveying track 510. The conveying surface 513 with the carrier elements 514 is located between the lateral first coupling profiles 511.

Figure 13:
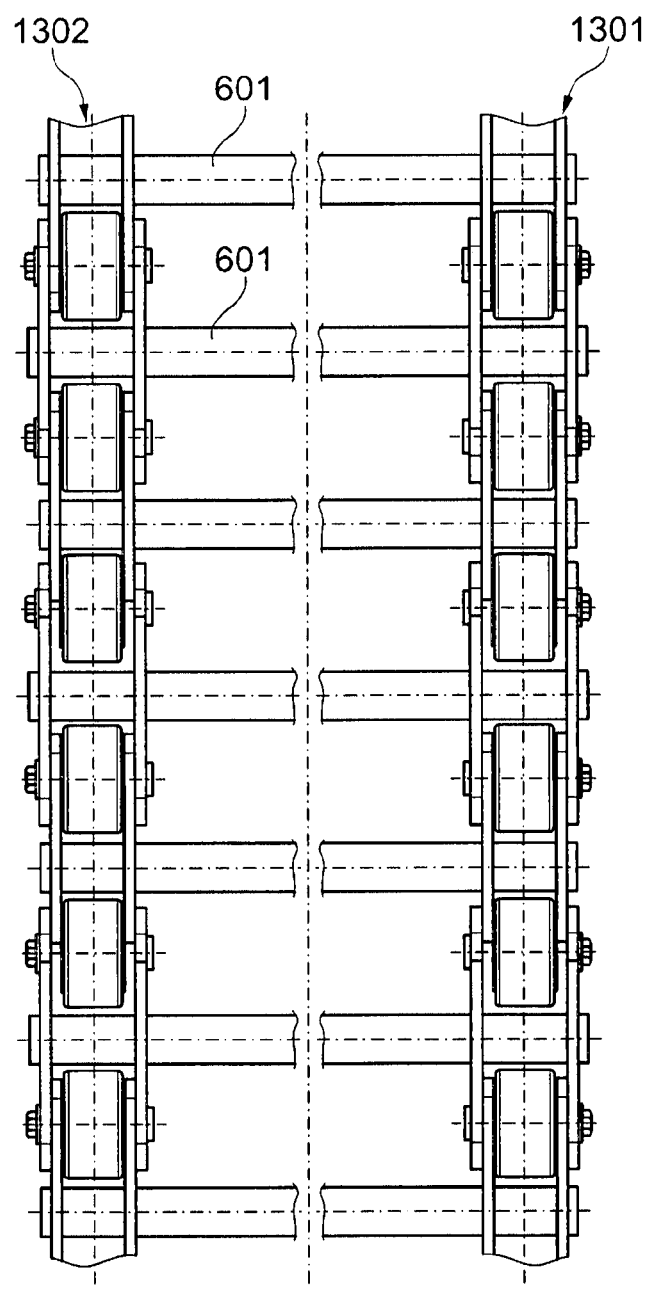
FIG. 13 shows a schematic illustration of a section of a conveying system comprising a driving track with two separated carrier tracks which are connected by rod elements, according to an exemplary embodiment of the present invention.

FIG. 13 shows a schematic illustration of a portion of a conveying system 500 comprising a driving track 521 with two separated (in the transverse direction) carrier tracks 1301, 1302 which are connected with rod elements 601. The carrier tracks 1301, 1302 for example form chain elements. The rod elements 601 can for example be detachably fastened at the carrier tracks 1301, 1302.

Figure 14:
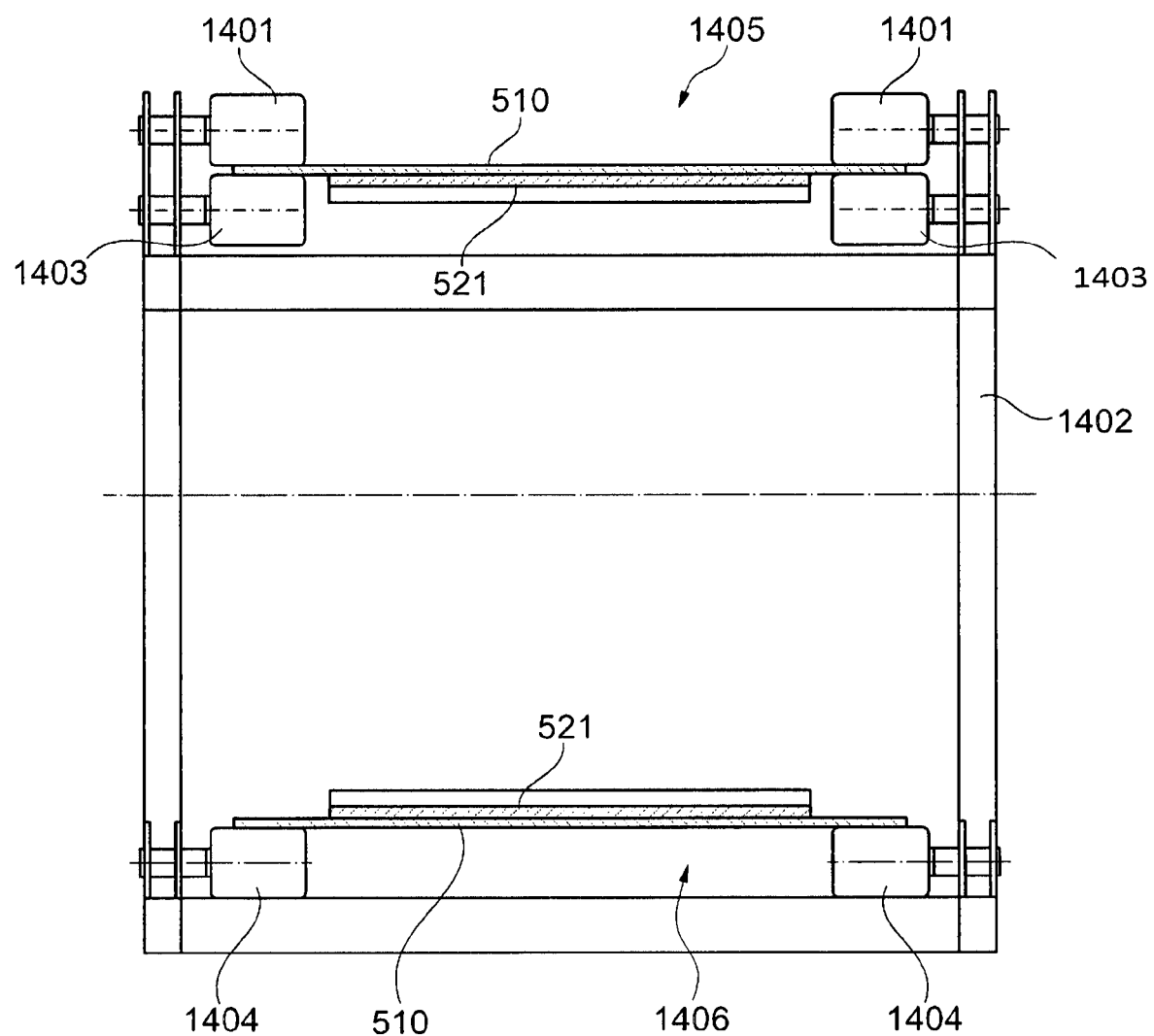
FIG. 14 and FIG. 15 show schematic illustrations of a section of a conveying system, in which pressure rollers are illustrated, according to an exemplary embodiment of the present invention.

FIG. 14 shows a schematic illustration of a portion of a conveying system 500, in which pressing rollers 1401 are illustrated. The conveying track is for example formed as a loop and comprises a leader portion 1405 by means of which the item to be conveyed is transported. After releasing the conveyed item and after deflection about a deflection roller, the conveying track 510 is returned along a return portion 1406. In the shown example, supporting rollers 1404 are further shown, on which the return portion 1406 is supported as a result of its weight force. Further, supporting rollers 1403 are shown, on which the leader portion 1405 is supported together with the driving track 521. The pressing rollers 1401 are formed in such a way that the conveying track 510 is pressed together and guided between the pressing rollers 1401 and the supporting rollers 1403. Thereby, an improved guiding of the conveying track 510 is assured.

Figure 15:
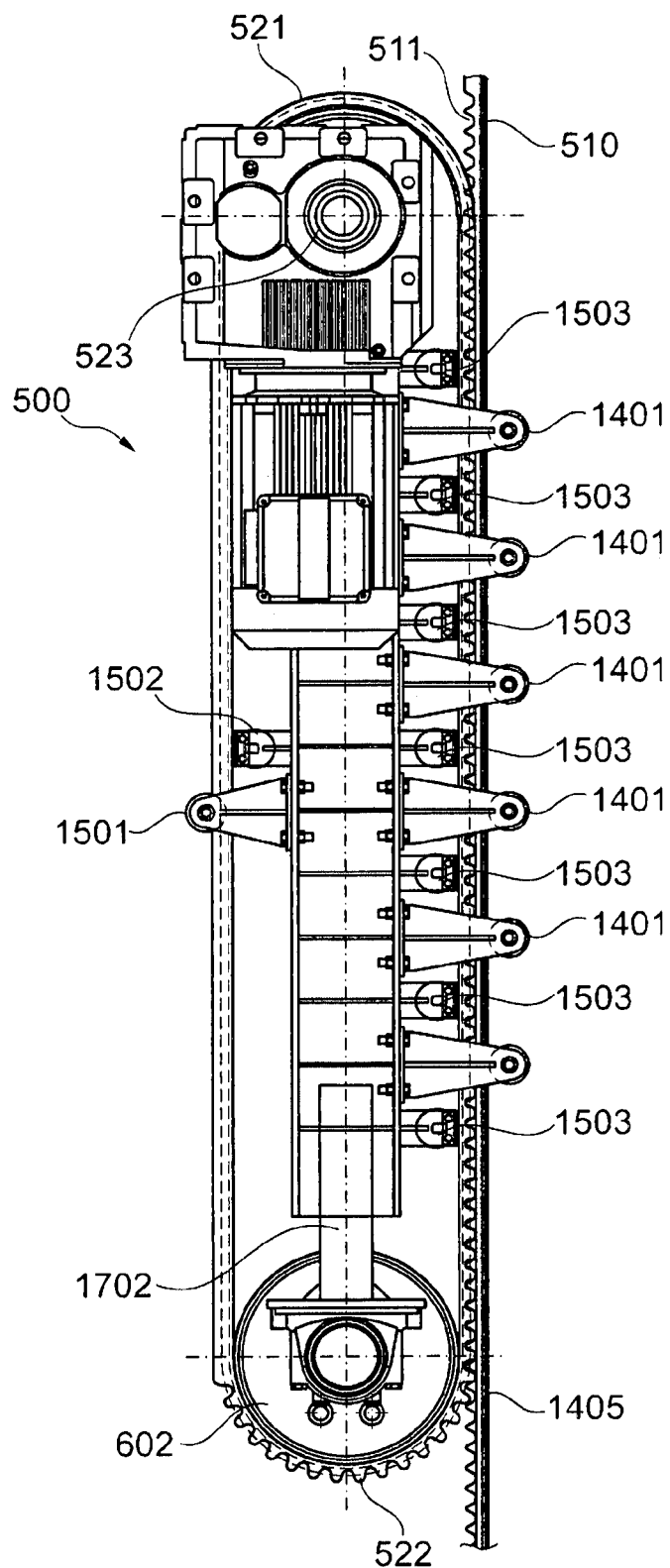

FIG. 15 shows a side view of a portion of a conveying system 500 according to an exemplary embodiment, in which the pressing rollers 1401 are also shown. The pressing rollers 1401 are arranged along a leader portion 1405 of the conveying track 510. These guide the conveying track 510 along a desired trail and thereby improve the running behavior of the conveying track 510.

A further pressing roller 1501 can press the driving track 521 against a supporting roller 1502 at a return portion of the driving track 521 in order to assure a more robust guiding of the driving track 521. Similarly, a further guiding roller 1503 can be provided at a feeding portion of the driving track 521 in order to guide the driving track 521 and to assure a more robust guiding of the driving track 521. The guiding roller 1503 can be formed across the complete width of the guiding roller 1503.

Figure 16:
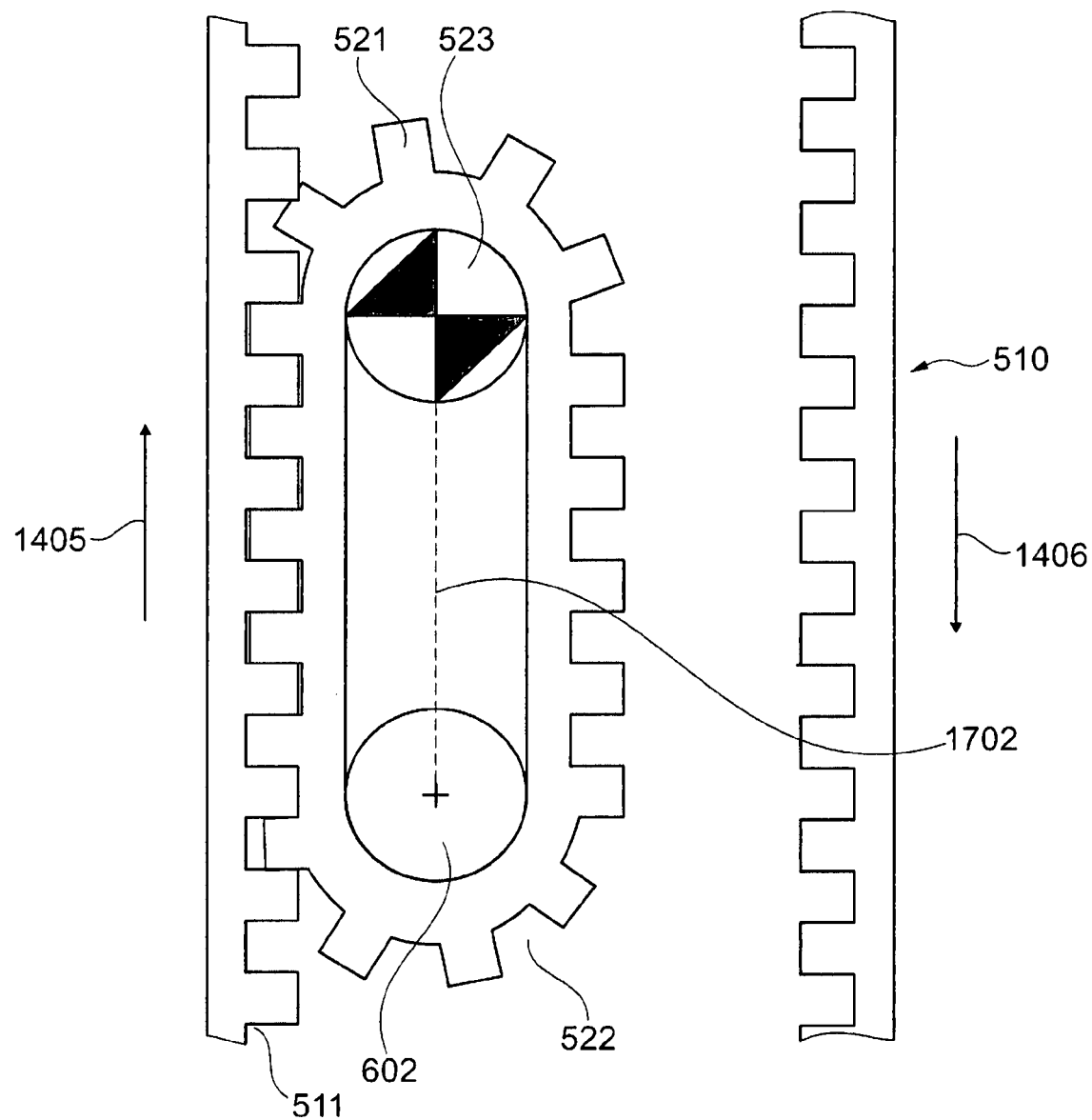
FIG. 16 is a schematic illustration of a section of a conveying system, wherein the driving track is coupled with the leader portion and the return portion, according to an exemplary embodiment of the present invention.

FIG. 16 shows a schematic illustration of a portion of a conveying system 500, wherein the driving track 521 is coupled with the leader portion 1405 and the return portion 1406 of the conveying track 510. The driving track 521 correspondingly forms a closed loop which is guided around tow separated circulating rollers 602. One of the circulating rollers can function as a driving element 523. The rotational axes of the circulating rollers 602, 523 are arranged at a common central axis 1702. The driving drum 523 applies the conveying force, for example as driving force or braking force, and transmits it to the driving track 521.

The conveying track 510 forms a closed loop which is guided around two further separated circulating rollers, wherein the conveying track comprises a leader portion 1405 and a return portion 1406 which are separately guided between the further circulating rollers. The driving track 521 is arranged and formed in such a way that at least a portion of the driving track 521 is coupled with the first coupling profile 511 at the leader portion 1405 and such that a further portion of the driving track 521 is coupled with the first coupling profile 511 at the return portion 1406 of the conveying track 510.

When the conveying system 500 conveys along a certain inclination (for example vertically as illustrated in FIG. 16), in which the conveyor good is conveyed to a certain elevation or height, then the leader portion 1405 leads from a lower circulating roller to an upper circulating roller. The return portion 1406 leads from the upper circulating roller to the lower circulating roller. The driving element 523 correspondingly transmits a certain driving force through the driving track 521 in order to convey the conveyor good to the desired elevation. The conveying track 510 along the return portion 1406 correspondingly comprises a certain a weight force. The weight force thereby produces a force which counteracts the driving force with which the leader portion 1405 is driven. A return portion of the driving track is coupled with the return portion 1406 of the conveying track 510 in FIG. 16 such that the weight force of the conveying track 510 is transmitted to the driving track 521. Since the driving track 521 is diverted at a lower position and the return portion of the driving track 521 merges into the leader portion of the driving track 521, also the applied weight force is diverted such that it works in the direction of the driving force and amplifies the latter correspondingly. Thereby, the weight force of the return portion of the conveying track 510 can be received and diverted by the driving track 521.

Figure 17:
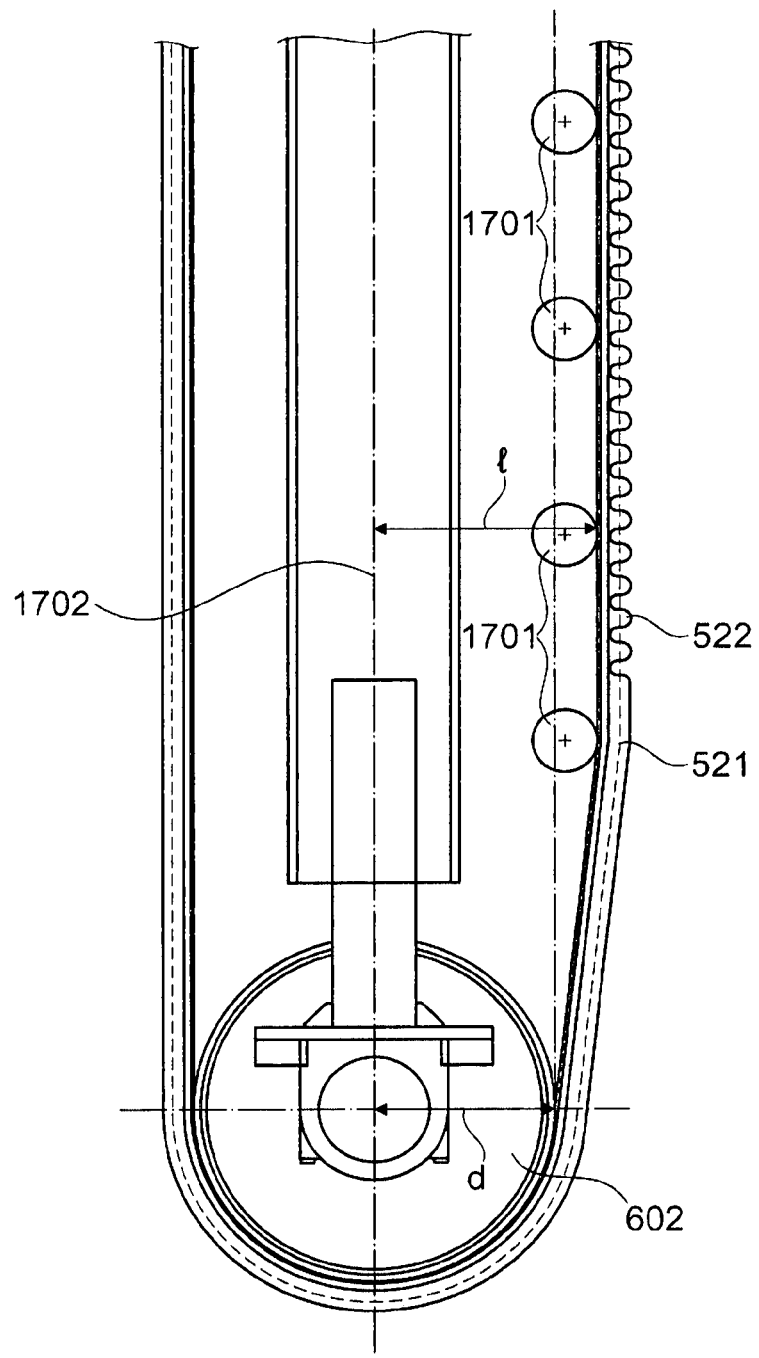
FIG. 17 is a schematic illustration of a section of a conveying system with guiding rollers which form an exaltation, according to an exemplary embodiment of the present invention.

FIG. 17 shows a schematic illustration of a portion of a conveying system 500 with guiding rollers 1701 which form an exaltation. The driving track 521 is guided over at least one guiding roller 1701. The guiding roller 1701 is arranged in such a way that a distance l between the central axis 1702 and the point of contact between the guiding roller 1701 and the driving track 521 is larger than a diameter d of at least one of the diverting rollers 602 and/or driving drums 523. Thereby, the guiding roller 1402 presses or pushes the driving track 521 away from the central axis 1702, in particular in the direction towards the conveying track 510 (not shown). In other words, the feeding portion is pushed further away from the opposing return portion of the driving track by means of the guiding roller 1701, such that an exaltation is formed. Along this exaltation a more stable coupling with the first coupling profile 511 of the conveying track 510 (not shown) is assured.

It is additionally noted that "comprising" does not exclude other elements or steps and that "a" or "an" does not exclude a plurality. It is further noted that features or steps, which have been described with reference to one of the above exemplary embodiments, can also be utilized in combination with other features or steps of other exemplary embodiments described above. Reference numerals in the claims are not to be construed as limiting.

List of reference numerals:

1 traction force
2 intermediate/conveying drive
3 reduced traction force
4 smooth surface
5 profiled surface
6 smooth surface
7 profiled surface
500 conveying system
510 conveying track
511 first coupling profile
512 coupling surface -continued List of reference numerals:

513 conveying surface
514 carrying element
520 conveying drive
521 driving track
522 second coupling profile
523 driving element
524 support element
530 conveying direction
550 item to be conveyed
601 rod element
602 deflection roller
603 link chain
604 support rollers
701 coupling bumps
702 screw element
801 coupling element
802 screw element
803 third coupling profile
804 further toothed profile
901 edge portions
1301 carrier track
1302 carrier track
1401 pressing roller
1402 carrier structure
1403 supporting roller
1404 supporting roller
1405 leader
1406 return
1501 pressing roller
1502 supporting roller
1503 guiding roller
1701 guiding roller
1702 central axis
d outer diameter of deflection roller
l distance of driving track from central axis

The invention claimed is:

1. A conveying system for conveying an item to be conveyed, the conveying system comprising:
   a conveying track which comprises a conveying surface on which the item to be conveyed is placeable,
   wherein the conveying track comprises a coupling surface formed adjacent to the conveying surface, wherein the coupling surface comprises a first coupling profile,
   at least one conveying drive for driving and/or braking the conveying track, wherein the conveying drive comprises a second coupling profile, wherein the first coupling profile is coupled with the second coupling profile in such a way that the conveying drive is coupled with the conveying track in an interlocking manner for transferring a conveying force, and
   at least one pressing roller and one supporting roller, which are arranged in such a way that the conveying track is present between the pressing roller and the supporting roller, in order to stabilize the conveying track.

2. The conveying system according to claim 1, further comprising at least one of the features:
   wherein the coupling surface of the conveying track is formed opposite to the conveying surface,
   wherein the coupling surface of the conveying track is formed at the side of the conveying surface,
   wherein the coupling surface of the conveying track is formed at the conveying surface, and
   wherein the first coupling profile forms a toothed profile.

3. The conveying system according to claim 1, wherein at least one of the first coupling profile and the second coupling profile is formed as a toothed belt profile.

4. The conveying system according to claim 1, further comprising
a coupling band,
wherein the first coupling profile is formed at the coupling band which is fixated at the coupling surface.

5. The conveying system according to claim 1,
wherein the conveying drive comprises a driving track,
wherein at least a portion of the driving track extends parallel to a coupling portion of the conveying track which comprises the first coupling profile,
wherein the driving track forms the second coupling profile in such a way that the driving track engages with the conveying track in an interlocking manner along the coupling portion of the conveying track.

6. The conveying system according to claim 5,
wherein the driving track forms a closed loop which is guided around two circulating rollers which are spaced apart,
wherein the rotational axes of the circulating rollers are arranged on a common central axis.

7. The conveying system according to claim 6,
wherein the conveying track forms a closed loop which is guided around two further circulating rollers which are spaced apart, wherein the conveying track comprises a leader portion and a return portion, which are guided spaced apart from each other between the further circulating rollers,
wherein the driving track is arranged and formed such that at least a portion of the driving track is coupled with the first coupling profile at the leader portion and a further portion of the driving track is coupled with the first coupling profile at the return portion of the conveying track.

8. The conveying system according to claim 6,
wherein the driving track is guided over at least one guiding roller,
wherein the guiding roller is arranged in such a way that a distance between the central axis and the point of contact between the guiding roller and the driving track is larger than a diameter of at least one of the deflection rollers.

9. The conveying system according to claim 5,
wherein the driving track comprises at least one rod element which extends transverse to a conveying direction of the conveying track and forms the second coupling profile.

10. The conveying system according to claim 9,
wherein the driving track comprises at least two separated carrier tracks, which in particular comprise chain elements, between which the at least one rod element is arranged.

11. The conveying system according to claim 5, further comprising
coupling elements which form the second coupling profile,
wherein the coupling elements are fixated at the driving track.

12. The conveying system according to claim 11,
wherein the coupling elements are detachably coupled at the driving track.

13. The conveying system according to claim 5,
wherein the conveying drive comprises a driving element which is coupled with the driving track in order to transfer a conveying force.

14. The conveying system according to claim 13, further comprising at least one of the features:
wherein the driving element is coupled with the driving track in a frictionally engaging manner, and
wherein the driving element comprises a further toothed profile and the driving track comprises a third coupling profile for coupling with the tooth profile of the driving element in an interlocked manner.

15. The conveying system according to claim 1, further comprising
at least one further conveying drive for driving and/or breaking the conveying track,
wherein the further conveying drive is arranged in the conveying direction of the conveying track and spaced apart from the conveying drive,
wherein the further conveying drive comprises a further second coupling profile,
wherein the first coupling profile of the conveying track is coupled with the further second coupling profile in such a way that the further conveying drive is coupled with the conveying track in an interlocked manner for transferring a conveying force.

16. The conveying system according to claim 15,
wherein a traction force is specifically limited or specifically maintained below a maximum traction force independently of the conveying height of the conveyor by specifically selecting the number of conveying drives, the distance between the conveying drives, and the drive forces or drive powers at the conveying drives.

17. The conveying system according to claim 15,
wherein the conveying track comprises an inclination relative to a horizontal,
wherein the conveying drive and the further conveying drive are arranged at different heights relative to the horizontal.

18. The conveying system according to claim 15,
wherein at least the conveying drive or the further conveying drive is modularly coupleable at the conveying track.

19. A method of conveying an item to be conveyed, the method comprising
placing an item to be conveyed on a conveying surface of a conveying track,
wherein the conveying track comprises a coupling surface formed adjacent to the conveying surface, wherein the coupling surface comprises a first coupling profile,
driving the conveying track by means of a conveying drive,
wherein the conveying drive comprises a second coupling profile, wherein the first coupling profile is coupled with the second coupling profile in such a way that the conveying drive is coupled with the conveying track in an interlocking manner for transferring a conveying force, and
stabilizing the conveying track by including at least one pressing roller and one supporting roller which are arranged in such a way that the conveying track is present between the pressing roller and the supporting roller.

* * * * *